Figure 1:
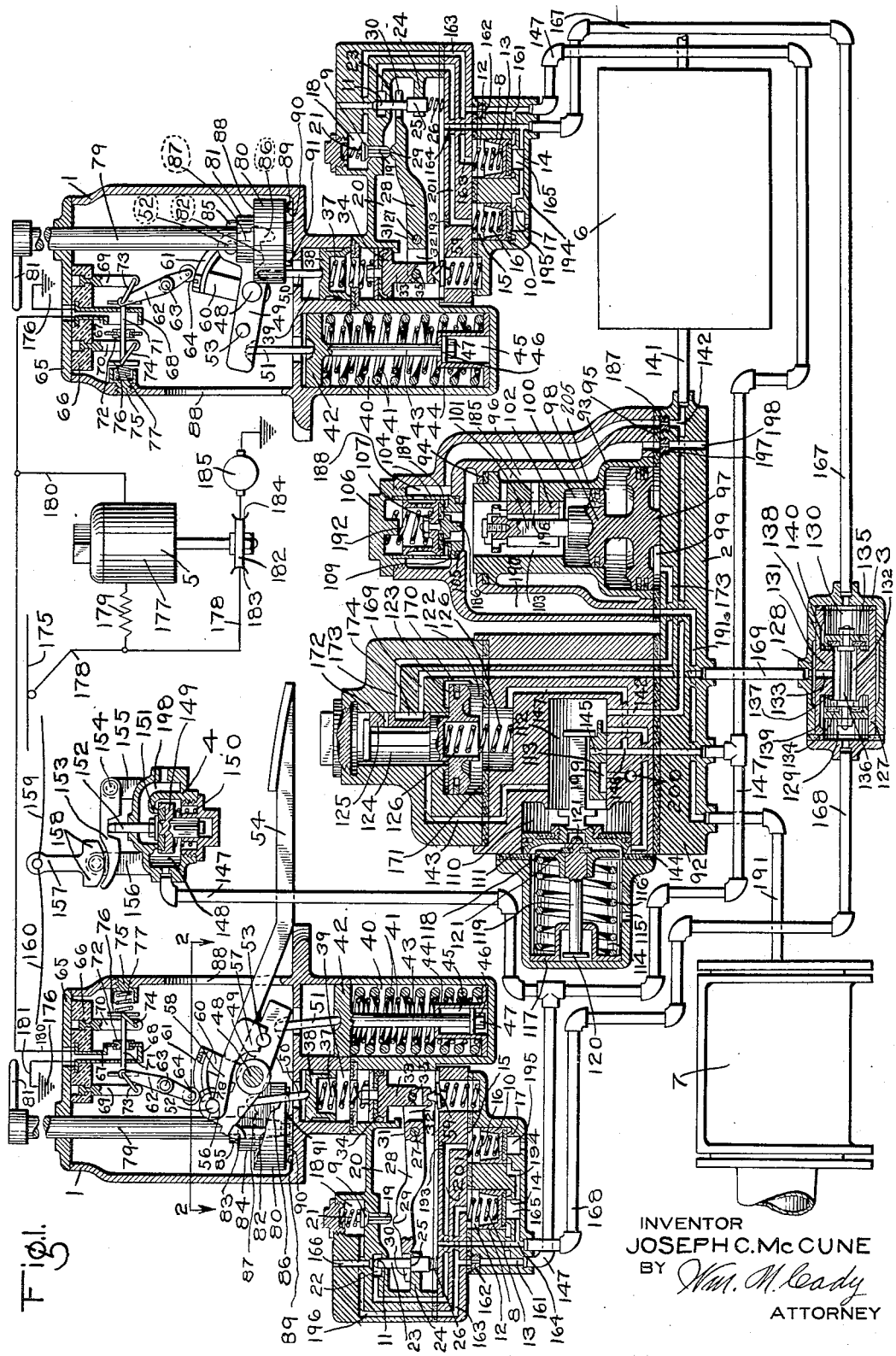

May 1, 1934. J. C. McCUNE 1,956,690
FLUID PRESSURE BRAKE
Filed Dec. 20, 1929 3 Sheets-Sheet 1

INVENTOR
JOSEPH C. McCUNE
BY Wm. M. Cady
ATTORNEY

May 1, 1934.  J. C. McCUNE  1,956,690
FLUID PRESSURE BRAKE
Filed Dec. 20, 1929  3 Sheets-Sheet 2
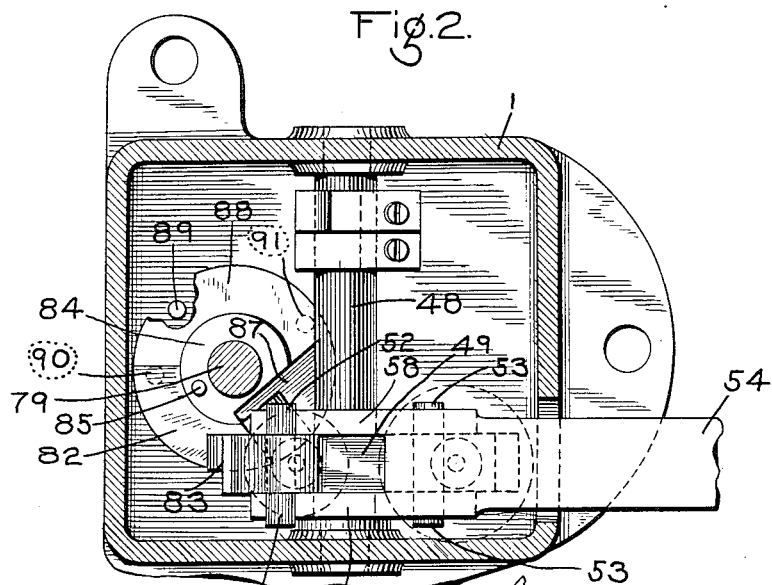
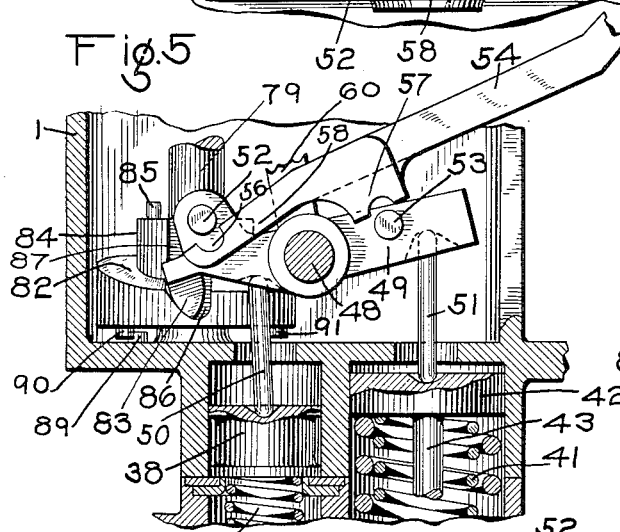
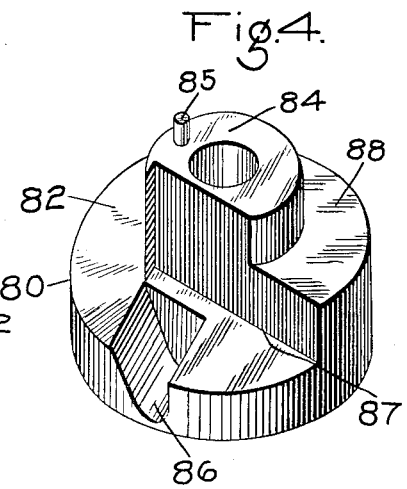
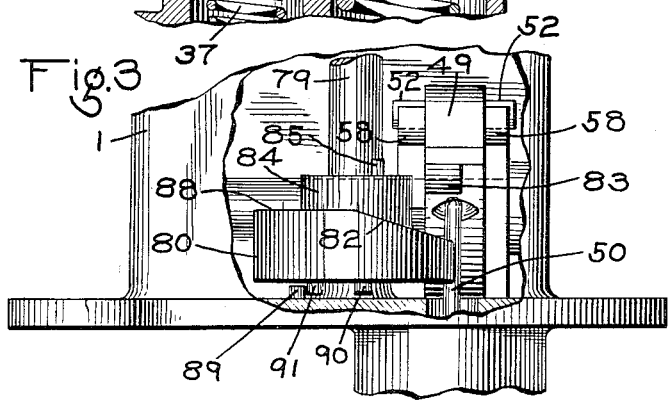
INVENTOR
JOSEPH C. McCUNE
BY Wm. M. Cady
ATTORNEY

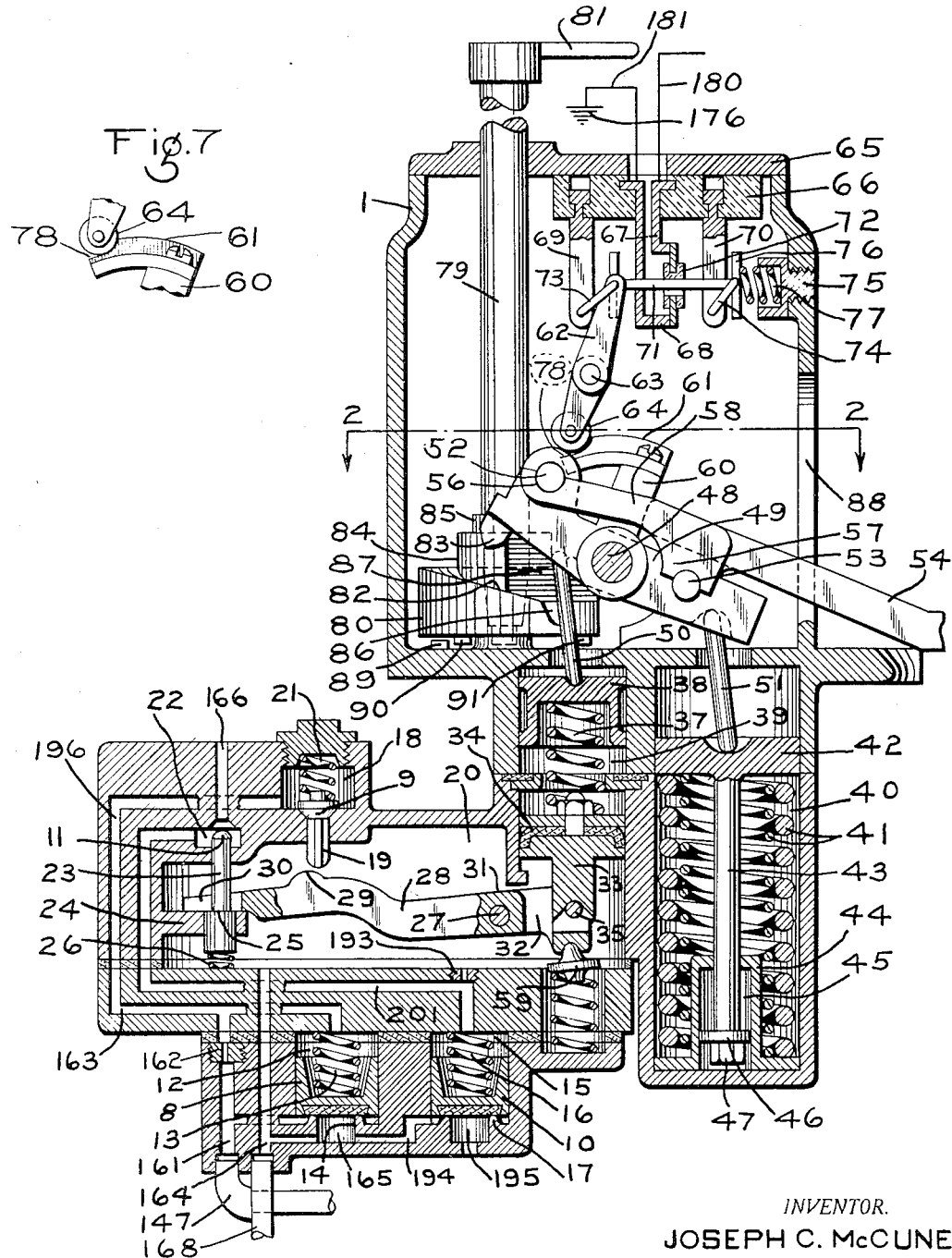

Patented May 1, 1934

1,956,690

UNITED STATES PATENT OFFICE 1,956,690

FLUID PRESSURE BRAKE

Joseph C. McCune, Edgewood, Pa., assignor to The Westinghouse Air Brake Company, Wilmerding, Pa., a corporation of Pennsylvania Application December 20, 1929, Serial No. 415,439

13 Claims. (Cl. 303—23)

This invention relates to fluid pressure brake equipment and more particularly to the type employed in traction cars for controlling the brakes.

One object of my invention is to provide an improved fluid pressure brake equipment which is simple in construction and which is provided with safety apparatus automatically operative to cut off the supply of electric current to the motors of a car and to apply the brakes to stop the car, in case of emergency.

Another object of my invention is to provide an improved fluid pressure brake equipment having means adjustable by the operator for limiting the braking force obtainable in an application of the brakes on a car, according to the load carried by the car.

Another object of my invention is to provide an improved fluid pressure brake equipment including an improved and novel foot-operated brake valve device for controlling the brakes on a car.

Other objects and advantages will be apparent from the following more detailed description of my invention.

In the accompanying drawings; Figure 1 is a diagrammatic view, partly in section, of a fluid pressure brake equipment embodying my invention; Fig. 2 is a sectional view taken on the line 2—2 of the foot-operated brake valve device shown in Fig. 1; Fig. 3 is a side elevation of a portion of the foot-operated brake valve device shown in Fig. 1 with a portion of the casing broken away in order to show more clearly the relative positions of certain members; Fig. 4 is an isometric view of the variable pressure cam member; Fig. 5 is a fragmentary internal view of the brake valve device showing certain members in the position in which the foot pedal is removable; Fig. 6 is an enlarged view of the foot operated brake valve device shown in Fig. 1; and Fig. 7 is a fragmentary view of the switch operating mechanism in the brake valve device.

As shown in the drawings, the fluid pressure brake equipment comprises a foot-operated brake valve device 1 at each end of the car, a valve device 2, a double check valve device 3, a vent valve device 4, a circuit breaker device 5, a main reservoir 6, and a brake cylinder 7.

The foot-operated brake valve device comprises a casing containing an application valve piston 8, a pilot valve 9 for controlling the operation of said application valve piston, a release valve piston 10 and a release pilot valve 11 for controlling the operation of the release pilot valve piston. The application valve piston 8 has a chamber 12 at one side and a spring 13 in said chamber urges said valve piston toward a seat rib 14 in the casing. The release valve piston 10 has a chamber 15 at one side and a spring 16 in said chamber urges said valve piston toward a seat rib 17 in the casing.

The application pilot valve 9 is contained in a chamber 18 and has a fluted stem 19 extending through a suitable bore in the casing and into a chamber 20. A spring 21 is provided in chamber 18 to urge the valve 9 towards its seated position, as shown in the drawings.

The release pilot valve 11 is contained in a chamber 22 and has an elongated stem 23 extending into chamber 20. The lower end of stem 23 is enlarged and is adapted to slidably operate through a bore in a lug 24 extending into chamber 20 from the casing, the enlarged portion of the stem 23 forming a shoulder 25. Interposed between the enlarged portion of stem 23 and the casing is a spring 26 for urging the valve 11 to its seat.

For operating the application pilot valve 9 and release pilot valve 11, a lever 31 is provided. Said lever is mounted in chamber 20 and is fulcrumed on a shaft 27. Said lever has an arm 28 extending to one side of shaft 27, and on said arm is a boss 29 adapted to engage the fluted stem 19 of valve 9 for unseating said valve when the lever is turned in a clockwise direction. The outer end of said arm is forked, being provided with tines 30 which pass on each side of the release pilot valve stem 23 and are adapted to engage shoulder 25 on said stem, so that when the arm 28 is turned in a counter-clockwise direction, the release pilot valve 11 is unseated.

The lever 31 is provided on the opposite side of shaft 27 with a forked arm 32, provided with a fulcrum pin 35 which is adapted to be engaged by the recessed end of a stem 33 carried by piston 34. The piston 34 is adapted to slidably operate in a bore in the casing and is subject at the lower side to fluid pressure in chamber 20 and subject at the upper side to the pressure of a spring 37, the pressure of said spring being governed by the position of a plunger 38 engaging said spring and slidably mounted in a bore 39 in the casing.

Contained in a chamber 40 is a pair of springs 41, one end of each of said springs engaging a wall of the casing, while the opposite ends of said springs engage a plunger 42 slidably mounted in chamber 40 and having a stem 43 extending through an opening at the upper end of a guide member 44 and into a chamber 45 within said member. The lower end of stem 43 is provided with a collar 46 adapted to engage member 44 to limit the expansion of the springs 41, and a nut 47 is provided on said stem to hold collar 46 on the stem 43.

Mounted on a shaft 48 in the brake valve casing is a lever 49. Interposed between one arm of said lever and plunger 38 is an operating pin 50, while interposed between the other arm of said lever and plunger 42 is an operating pin 51. Through said pins and the lever 49, the pressure of springs 41 is adapted to be transmitted to plunger 38 for shifting said plunger downwardly to apply the brakes on a car.

One arm of lever 49 carries a pin 52 and the other arm, a pin 53, said pins extending outwardly on each side of the lever.

A foot operated pedal lever 54 is provided with an arm, the outer end of which is forked and is adapted to straddle the lever 49. Each tine 58 of the fork on said foot pedal arm is provided at the upper side and at the extreme end with a recess 56 adapted to receive the lower portion of pin 52 and each tine is provided at the lower side with a lug 57 having a recess adapted to fit over the pin 53. With the foot pedal in place, as shown in the drawings, downward pressure thereon will thus obviously cause the lever 49 to rotate in a clockwise direction on the shaft 48, such downward pressure being adapted to compress springs 41 by reason of pin 51 and plunger 42 being forced downwardly. As the springs 41 are thus compressed, the spring 37 is permitted to expand so that a spring-pressed plunger 59 is permitted to shift piston 34 upwardly to the position shown in the drawings.

Also carried by the foot pedal shaft 48 is an arm 60 having mounted at its outer end a cam-like member 61 which is adapted to be rotated by shaft 48 as the lever 49 is rotated.

A lever 62 is rotatably mounted on a pin 63 in the casing and is provided at the lower end with a roller 64 adapted to engage the cam-like member 61.

Secured to the inner side of a cover plate 65, mounted on the casing, is a block 66 of insulating material and carried by said block are two contact members 67 and 68. A switch contact member 72 carried by but insulated from a rod 71 is adapted to bridge the contact members 67 and 68, and said rod is carried by links 73 and 74, which links are pivotally mounted on support members 69 and 70 secured to the block 66. The lever 62 is operatively connected to rod 71 at the junction with link 73. A spring retainer 75 is provided in the casing and interposed between said retainer and a collar 76 on rod 71 is a spring 77 for urging the switch member 72 into engagement with contacts 67 and 68.

The cam 61 is provided at one end with a recess 78 into which the roller 64 is forced by the pressure of spring 77 acting through rod 71. In any other position of cam 61, the roller 64 is forced out of the recess 78 by the cam, which causes the lever 62 to rotate clockwise and shift rod 71 to the right against the pressure of spring 77 and to a position in which contacts 67 and 68 are disconnected from each other through switch member 72.

Mounted on a shaft 79 is a cam 80 and a handle 81 for turning said cam. The cam 80 is located at one side of the lever 49 in such a manner as not to interfere with the operation of said lever or of the operating pin 50, but so that the inclined surface 82 on the upper side of the cam is directly beneath a lug 83 at the left end of the lever 49.

The cam 80 is provided with a hub portion 84 through which the shaft 79 projects. The periphery of the hub 84 extends outwardly from the shaft 79 and beneath the inner tine 58 of the foot pedal lever 54. The relative heights of the hub 84 and the inclined surface 82 are such that, when the lug 83 engages the inclined surface 82 of the cam, when the cam is in a position such as shown in Fig. 1 of the drawings, there is insufficient space between the upper face of the hub and the lower face of the inner tine 58 to permit said tine to be moved downwardly until pin 52 is entirely out of the recess 56 in said tine in order to permit removal of the foot pedal lever 54.

If the cam is turned to a position in which the lug 83 on lever 49 strikes the inclined surface 82 at or near the top of said inclined surface, then the space between the upper face of the hub 84 and the lower face of the inner tine 58 is such as to permit removal of the foot pedal lever 54, since the inner tine 58 may be lowered by raising the foot pedal lever until the pin 52 is entirely out of the recess 56. It is, however, undesirable to permit removal of the foot pedal lever in this position of the cam, and in order to prevent such, a pin 85 is provided in the upper face of the hub 84. This pin is adapted to turn with the hub, so that in the position of cam 80 just described, the pin 85 is in line with the lower face of the tine 58, so as to limit the space between said tine and the upper face of the hub to an amount insufficient for the recess 56 to be moved out of engagement with pin 52.

Adjacent the lowest point on the cam surface 84 is a recess 86, as more clearly shown in Fig. 4, adapted to receive lug 83 on lever 49 and in line with said recess the hub 84 is cut out or provided with another recess 87, which is adapted to receive the inner tine 58 of the foot pedal lever 54. With the cam in this position and lug 83 of lever 49 engaging the bottom of recess 86, clearance is provided in recess 87 beneath the inner tine 58 to permit said tine to be lowered until recess 56 is clear of pin 52. The foot pedal lever 54 and tines 58 may then be pulled outwardly through an opening 88 in the casing and thus removed from the brake valve device. When the foot pedal is thus removed, the brake valve device is in a pedal-off position, as will be more fully explained hereinafter.

As shown in Fig. 4 of the drawings, the inclined surface 82 on the cam 80 extends only partly around the upper face of the cam, and at the point of maximum height, said inclined surface meets a horizontal surface 88. The length of the inclined surface is such as to obtain the desired variation in degree of rotation of lever 49 and in order to limit the cam rotation, so that in one extreme position the lug 83 will engage recess 86 and in the opposite extreme position, said lug will engage the horizontal surface 88 at the junction with the inclined surface 82, pin 89 is fixed in the housing and spaced pins 90 and 91 are fixed in the side of the cam adjacent the housing. The pins 90 and 91 are so located in the cam as to engage the pin 89 in the housing and thereby limit the degree of rotation of the cam.

The valve device 2 comprises a pipe bracket 92 upon which is mounted an application valve device and a protection valve device, an emergency valve device being preferably associated with said protection valve device.

The application valve device comprises a casing having a removable bushing 93 which engages a gasket 94 on one end and a gasket 95 at the opposite end and thereby forms an annular chamber 96 surrounding the bushing. The removable bushing contains two connected pistons 97 and 98 of different areas, the piston 97 being contained in a chamber 99 and piston 98 being contained in a chamber 100. Projecting from piston 98 is a stem 101 engaging a slide valve 102 in a chamber 103, said slide valve being adapted to be operated by the piston 97.

The application valve device also comprises a valve piston 107 slidably mounted in a removable bushing 104, which is secured against a gasket 105 by a nut 106 having screw-threaded engagement in the casing. A spring 192 is interposed between said valve piston and the inner side of nut 106 for urging said valve piston into engagement with a seat rib 109 in the bushing 104.

The protection valve device comprises a casing having a chamber 110 containing a piston 111 and a chamber 112 containing a slide valve 113 adapted to be operated by said piston. At the left side of the piston 111 is a chamber 114 connected with the atmosphere through a passage 115 and containing a spring 116 adapted to urge said piston to the right. The spring 116 is mounted between two retaining members 117 and 118. Through central openings in said retaining members is placed a rod 119 having at one end a head 120 and adjacent the opposite end said rod is recessed to receive a lock washer 121, said head 120 and lock washer 121 being of greater diameter than the openings through the retainer members, so as to limit the expansion of said spring and thus provide easy assembly in the device.

The emergency valve device is preferably shown associated with the protection valve device and comprises a casing having a chamber 122 containing a piston 123 and a chamber 124 containing a slide valve 125 adapted to be operated by said piston. A spring 126 is contained in chamber 122 and is adapted to urge the piston and slide valve to the position shown in the drawings.

The double check valve device 3 is of a well known construction comprising a casing having a bushing 127 pressed in place and forming an annular chamber 128 in the casing. The bushing 127 has a chamber 129 in one end and a chamber 130 in the opposite end, a partition wall 131 separating said chambers. A bore 132 is provided through the partition wall 131 to connect chambers 129 and 130, and a passage 133 connects bore 132 to chamber 128. A valve 134 is contained in chamber 129 and a valve 135 is contained in chamber 130, said valves being connected by a stem 136 extending through bore 132. A seat rib 137 is provided in chamber 129 for valve 134 to seal against, while a seat rib 138 is provided in chamber 130 for valve 135 to seal against. To permit communication between the opposite sides of valve 134, a by-pass groove 139 is provided in the bushing; likewise a by-pass groove 140 is provided around valve 135.

The vent valve device 4 comprises a casing having a chamber 148 containing a valve 149 and a spring 150 for normally seating said valve against a seat rib 151. Said valve has an upwardly extending stem 152 adapted to be engaged by a lever 153 for unseating the valve 149, said lever being fulcrumed on a pin 154 in a lug 155 projecting from the casing. Pivotally mounted on another lug 156 is another lever 157 provided with arms 158 adapted to engage the lever 153 for rotating the lever 153 counterclockwise, so as to unseat valve 151. To the outer end of lever 157, cords 159 and 160 are connected, said cords extending to opposite ends of the car for the purpose of permitting remote operation of said lever.

The circuit breaker device 5 comprises a magnet 177 and a switch member 182 adapted to be operated by said magnet when energized to connect a contact 183 to a contact 184. Upon deenergization of magnet 177, the switch 182 is adapted to drop out of engagement with contacts 183 and 184 by gravity.

Only one foot pedal 54 is provided per car, and is applied at the end of the car from which the car brakes are to be controlled. In Fig. 1 of the drawings, the left hand end of the equipment is assumed to be the operating end or the end from which the brakes are controlled, and the right hand end is the non-operating end.

At the non-operating end of the car, with the foot pedal removed, the pressure of springs 41 maintains plunger 42, operating pin 51, lever 49, pin 50 and plunger 38 in the pedal off position, as shown in the drawings. With plunger 38 in its lower or pedal off position, the pressure of spring 37 holds piston 34 downwardly against the pressure of the spring-pressed plunger 59 and thereby maintains the lever 31 in such a position as to hold the application pilot valve 9 unseated and permit spring 26 to seat the release pilot valve 11.

At the operating end of the car, the foot pedal 54 is depressed to release position, as shown in the drawings, in order to have the brakes released and to permit charging of the brake equipment, preparatory to operating the car.

Depressing the foot pedal 54, to the position shown in the drawings, rotates the lever 49 on shaft 48 in a clockwise direction, the lever 49 acting through pin 51 to compress the springs 41 and permitting spring 37 to expand and shift plunger 38 to the position shown in the drawings. With spring 37 expanded, the spring-pressed plunger 59 forces the piston 34 upwardly and rotates lever 31 in a counter-clockwise direction until tine 30 on said lever engages shoulder 25 on the release pilot valve 11 and moves said valve to its open position, in which the tine 30 engages lug 24 in the casing. In this position of lever 31, the boss 29 on said lever is moved out of engagement with stem 19 of the application pilot valve 9, and said valve is seated by the pressure of spring 21.

Fluid under pressure supplied to a main reservoir 6 by an air compressor in the usual well known manner, flows from said main reservoir through a pipe 141 to the valve device 2 and from thence through a passage 142 to the protection valve chamber 112 and from said chamber through a passage 143 to the emergency valve chamber 124.

With the protection valve chamber 112 initially at atmospheric pressure, the pressure of spring 116 holds the piston 111 and slide valve 113 in their inner position, but when the pressure of fluid supplied to said valve chamber becomes sufficient to overcome spring 116, said piston and slide valve are shifted outwardly until the piston engages a gasket 144, as shown in the drawings. In the outward position of slide valve 113, a restricted port 145 registers with passage 146 and fluid under pressure is permitted to flow from valve chamber 112 through said port and passage to pipe 147, which is connected to the brake valve device 1 at each end of the car and to the vent valve device 4.

In the vent valve device 4, the valve 149 is normally seated against seat rib 151 by spring 150, thereby permitting chamber 147 to become charged with fluid under pressure supplied through pipe 147.

Fluid under pressure supplied through pipe 147 to the brake valve device at the non-operating end of the car, flows through passage 161 to the exposed area of the application valve piston 8 outside of seat rib 14 and through a choke 162 to passage 163 connected to chamber 12 at the upper side of the application valve. Fluid under pressure also flows from passage 163 past the unseated application pilot valve 9 to chamber 20. The rate of flow through the choke 162 is such as to prevent a sudden build up of pressure in chamber 12 at the upper side of the application valve piston 8, so that the pressure of fluid acting on the outer seated area of said valve piston shifts said valve piston out of engagement with seat rib 14, thereby permitting fluid under pressure to suddenly flow from passage 161 to chamber 165 and from thence through passage 164 and pipe 167 to chamber 20 in the brake valve device, and to chamber 130 in the double check valve device 3. The chamber 20 in the brake valve device is thus initially charged through passage 163 and past the valve 9 and also through passage 164, and when the pressure in said chamber and valve piston chamber 12 become substantially equal, the pressure of spring 13 shifts the application valve piston 8 into engagement with seat rib 14, thereby cutting off further flow of fluid under pressure from passage 161 to chamber 165 and pipe 167. After the valve piston 8 is seated however, the pressure of fluid in pipe 167 is maintained by flow through choke 162, passage 163, past the unseated application pilot valve 9, through chamber 20 and passage 164.

The pressure of fluid thus built up in chamber 20 of the brake valve device at the non-operating end of the car, acts on the piston 34, tending to force said piston upwardly. However, in pedal off position of the brake valve device, the pressure of the compressed spring 37 is such as to prevent such upward movement of the piston 34.

Fluid under pressure supplied through pipe 147 to the brake valve device at the operating end of the car, flows through passage 161 to the outer seated area of valve piston 8 and through choke 162 and passage 163 to application pilot valve chamber 18 and application valve piston chamber 12. The pilot valve 9 being seated, the chambers 18 and 12 become charged with fluid under pressure, and the pressure of spring 13 holds the application valve piston 8 seated against seat rib 14.

As hereinbefore described, when the foot pedal 54 is depressed to the position shown in the drawings, the release pilot valve 11 is unseated, which provides a connection from the chamber 20 to the atmosphere through choke plug 193, passage 201 and an atmospheric passage 166. The valve chamber 129 of the double check valve device 3 being connected to chamber 20 through pipe 168 and passage 164 is thus normally at atmospheric pressure, so that the pressure of fluid supplied to chamber 130 of the check valve device 3 from the brake valve device at the non-operating end of the car is permitted to shift the valves 135 and 134 to the left, causing valve 135 to seal on seat rib 138 and cut off communication from chamber 130 to bore 132. Seating of valve 135 unseats valve 134, which establishes communication from pipe 169 to pipe 168 through passage 133, bore 132, by-pass groove 139 and through chamber 129.

As hereinbefore described, fluid under pressure is supplied to the emergency valve chamber 124 through passage 143 from the protection valve chamber 112 and acts therein to shift the emergency piston 123 and slide valve 125 downwardly to emergency position in which the piston engages a gasket 171. Fluid under pressure is then permitted to flow through a port 172 in the emergency slide valve 125 to passage 173 and from thence to the application piston chamber 99 and effect an application of the brakes, as will be fully explained hereinafter.

Fluid under pressure supplied through the protection valve slide valve 113 to passage 146 flows to the emergency piston chamber 122, and when the fluid pressure in said chamber becomes substantially equal to the pressure of fluid in the emergency valve chamber 124, the pressure of spring 126 shifts the emergency piston 123 and slide valve 125 to their normal positions, as shown in the drawings, in which position a feed groove 170 establishes a connection from valve chamber 124 to piston chamber 122, through which the pressure of fluid in said chambers remains equalized. With the emergency piston and slide valve in their normal positions, the application piston chamber 99 is connected to the atmosphere through passage 173, cavity 174 in the emergency slide valve 125, passage 169, passage 133 in the double check valve device, bore 132, by-pass groove 139, chamber 129, passage and pipe 168, chamber 20 in the brake valve device, choke plug 193, passage 201, past release pilot valve 11 and through atmospheric passage 166, in order to effect a release of the brakes, as will be more fully explained hereinafter.

In the manner above described, the brake equipment is charged with fluid under pressure and the brakes are released, however, in addition, when the foot pedal 54 is in the depressed position, as shown in the drawings, the cam-like member 61 is so positioned that roller 64 on the lower end of lever 62 is permitted to drop into recess 78 of said cam. This permits spring 77 to shift rod 71 to the left and turn lever 62 in a counter-clockwise direction. The insulated switch member 72 being carried by rod 71 is thus moved into engagement with contacts 67 and 68, thereby closing a circuit from a trolley wire 175 to a ground 176 through the magnet 177 by way of wire 178, resistance 179, magnet 177, wire 180, contacts 67 and 68, and wire 181.

The closing of an electric circuit through magnet 177, energizes said magnet, which operates to lift switch member 182 into engagement with contacts 183 and 184 and thereby close a circuit through which electric current is supplied from trolley wire 175 through wire 178 to a car motor 185.

If it is desired to effect an application of the brakes, the operator's foot pressure on the foot pedal 54 is relieved and the pressure of springs 41, acting through plunger 42 and operating pin 51, rotates lever 49 in a counter-clockwise direction, and thereby causes foot pedal 54 to be turned upwardly and maintained in engagement with the operator's foot.

The counter-clockwise rotation of lever 49 acts through pin 50 to shift the plunger 38 downwardly which tends to compress the spring 37.

The downward pressure on spring 37 causes the piston 34 to be moved downwardly and rotate lever 31 in a clockwise direction. The initial rotation of lever 31 causes tines 30 to move upwardly and permit spring 26 to seat the release pilot valve 11 and further rotation of said lever permits boss 29 on said lever to engage stem 19 of the application pilot valve 9 and unseat said valve against the pressure of spring 21.

Unseating of the application pilot valve 9 permits fluid under pressure to flow from the application valve piston chamber 12 to chamber 20 at a rate exceeding the rate of supply to chamber 12 through the choke 162. The pressure of fluid is thus reduced in chamber 12 and permits the higher pressure of fluid acting on the lower face of valve piston 8 outside of the seat rib 14 to shift said valve piston upwardly and connect passage 161 to chamber 165. As hereinbefore described, passage 161 is supplied with fluid under pressure from main reservoir 6 through restricted port 145 in the protection slide valve 113 and also through feed groove 170 around the emergency piston 123, so that fluid under pressure is thus permitted to flow from said passage past the unseated application valve 8, to chamber 165 and from thence through passage 164 to chamber 20 and pipe 168.

The fluid under pressure thus supplied to pipe 168 flows through chamber 129 in the double check valve device, by-pass groove 139, past valve 134, through bore 132, passage 133, pipe and passage 169, cavity 174 in the emergency slide valve, and passage 173 to the application piston chamber 99.

The pressure of fluid supplied to application piston chamber 99 acts to shift the application piston 97 upwardly. The initial upward movement of piston 97 causes slide valve 102 to be shifted so as to lap exhaust ports 185 in the slide valve seat, and further movement causes piston stem 101 to engage the stem 186 of valve piston 107 and shift said valve piston away from seat rib 109. This unseating of valve piston 107 permits fluid under pressure to flow from the main reservoir 6 through pipe 141, passage 142, choke plug 187, chamber 188, ports 189 in the removable bushing 104, past the unseated valve piston 107 to valve chamber 103 and from thence through chamber 190 and passage and pipe 191 to brake cylinder 7 and apply the brakes.

Fluid under pressure supplied by the application valve 8 through passage 164 to chamber 20 in the brake valve device flows through the choke plug 193 to release valve chamber 15 to hold the release valve piston seated against seat rib 17 and also acts on the lower side of piston 34, and when the pressure of fluid acting on said piston slightly exceeds the downwardly acting pressure of spring 37, the piston 34 is shifted upwardly against said spring. The upward movement of piston 34 permits spring-pressed plunger 59 to rotate lever 31 in a counter-clockwise direction to permit the application pilot valve 9 to seat. Seating of the pilot valve 9 permits the pressure in chamber 12 of the application valve piston 8 to equalize with the pressure acting on the lower face of said valve piston, so that the pressure of spring 13 is permitted to seat said valve piston against seat rib 14 and thereby prevent further flow of fluid under pressure to chamber 20 of the brake valve device and to application piston chamber 99.

When the supply of fluid under pressure is thus cut off to chamber 20, the piston 34 continues to move until the pressure of spring 37 becomes equal to the pressure of fluid acting on the lower face of said piston, when the movement of said piston ceases. When such occurs, both the application pilot valve 9 and release pilot valve 11 are seated and the pressure in chamber 20 of the brake valve device and application piston chamber 99 remains constant, this condition being generally known as lapping of the brakes.

When the brake valve device assumes lap position, as just described, the supply of fluid under pressure to application piston chamber 99 is cut off and the fluid under pressure therein is thus bottled up with that in the connected chamber 20 of the brake valve device. When the pressure of fluid supplied to the brake cylinder 7 and effective on the upper face of application piston 97, through port 205 in piston 98, becomes slightly greater than the opposing pressure in piston chamber 99, the piston 97 is moved downwardly to lap position in which the valve piston 107 is seated by spring 192 and prevents further flow of fluid under pressure to the brake cylinder 7, and the fluid under pressure in said brake cylinder is bottled up.

From the above description of the operation in effecting an application of the brakes, it will be noted that the degree of brake cylinder pressure obtained is governed by the pressure of spring 37. The pressure of spring 37 may be varied in applying the brakes by varying the position of lever 49. If only a light application is desired, the operator permits the foot pedal 54 to be moved up by spring 41 only a slight amount, which will permit only a limited rotation of lever 49 and consequently downward movement of plunger 38 and compression of spring 37. If a heavier application is desired, the operator permits the foot pedal 54 to move upwardly a greater amount, which causes a greater degree of compression of spring 37. If the maximum brake application is desired, the foot pressure is entirely removed from foot pedal 54. The springs 41 then rotate lever 49 until lug 83 on said lever engages the inclined surface 82 on cam 80, which limits the compression of spring 37 to a maximum degree. Whatever the degree of compression of spring 37, the fluid pressure in chamber 20 of the brake valve device always builds up to a degree slightly in excess of the pressure of said spring in order to cut off the flow of fluid under pressure to said chamber and to the application piston chamber 99, and then the pressure of fluid in the brake cylinder builds up to a degree slightly in excess of the pressure in piston chamber 99 in the same manner as hereinbefore described. It is thus obvious that an application of the brakes may be graduated on in steps, if desired.

If it is desired to stop the car by applying the brakes, as hereinbefore described, it is obviously consistent to cut off the electric power to the motor which is adapted to drive the car. According to my invention, when the brakes are applied by permitting upward movement of the foot pedal 54, the cam-like member 61 is rotated in a counter-clockwise direction when the lever 49 is thus rotated. Rotation of the cam-like member 61, causes roller 64 on lever 62 to roll out of recess 78 in member 61 and thereby rotate lever 62 in a clockwise direction about the fulcrum 63. This rotation of lever 62 shifts switch member 72 out of engagement with contacts 67 and 68, thereby opening the circuit through the magnet 177. The magnet 177 is thus deenergized and permits switch member 182 to drop out of engagement with contacts 183 and 184, thereby cutting off the supply of electric power from trolley wire 175 to the car motor 185.

If it is desired to release the brakes after an application is effected as above described, the foot pedal 54 is depressed to the release position shown in the drawings. Depressing the foot pedal compresses springs 41 and permits spring 37 to expand and shift plunger 38 upwardly to the position shown in the drawings. This permits the pressure of fluid in chamber 20 to shift the piston 34 upwardly and spring-pressed plunger 59 to rotate lever 31 in a counter-clockwise direction, causing tines 30 on said lever to engage shoulder 25 on the release pilot valve 11 and unseat said valve.

Unseating of the release pilot valve 11 vents fluid under pressure through passage 201 from chamber 15 at the upper side of the release valve piston 15 at a rate exceeding the rate of supply to said chamber from chamber 20 through choke plug 193. The pressure of fluid in chamber 15 is thereby reduced, which permits the pressure of fluid in chamber 20, acting on the outer seated area of the lower face of said valve piston, through passage 164, chamber 165 and passage 194, to unseat said valve piston against the pressure of spring 16, and thereby permit fluid under pressure to be vented from the chamber 20 to the atmosphere through passage 164, chamber 165, passage 194 and atmospheric chamber 195. In the manner hereinbefore described, chamber 20 in the brake valve device is connected to application piston chamber 99 in the valve device 2, so that fluid under pressure is also vented from said chamber 99.

In venting fluid under pressure from chamber 20 of the brake valve device and application piston chamber 99 of the valve device 2, the pressure of spring 16 seats valve piston 10 before the pressure in said chambers is reduced to that of the atmosphere. However, after said valve piston seats, an atmospheric connection is maintained from said chambers through choke plug 193, passage 201, past the unseated release pilot valve 11, and through atmospheric passage 166, which permits a complete reduction in pressure in said chamber.

When fluid under pressure is vented from application piston chamber 99, the fluid at brake cylinder pressure in the valve chamber 103 acts on the upper face of piston 97 due to the connection through port 205 in piston 98, and shifts the piston 97 to release position, as shown in the drawings, in which position fluid under pressure is vented from the brake cylinder 7, through pipe and passage 191, chamber 190, valve chamber 103, port 196 in the exhaust slide valve 102, passages 185, chamber 96, choke plug 197 and atmospheric passage 198, thereby causing a release of the brakes.

Under certain conditions, it may be desirable to effect only a partial release of the brakes instead of a full release of the brakes as above described. In such a case, the foot pedal 54 is only partly depressed toward the release position. This permits plunger 38 to be moved upwardly a certain distance by spring 37, but not sufficiently to permit said spring to expand for a complete release of the brakes.

The partial expansion of spring 37 reduces its downwardly acting pressure on piston 34 and permits the pressure of fluid in chamber 20 to shift said piston upwardly. Spring-pressed plunger 59 is thus permitted to rotate lever 31 and unseat the release pilot valve 11 and thereby cause the pressure in chamber 20 and application piston chamber 99 to be reduced in the same manner as hereinbefore described. When the pressure in chamber 20 is thus reduced to slightly below the reduced pressure of spring 37, said spring shifts piston 34 downwardly, causing lever 31 to rotate clockwise and permit release pilot valve 11 to seat. Seating of the release pilot valve permits an equalization of fluid pressures on the opposite sides of the release valve piston 10 and spring 16 then seats said valve piston and prevents further venting of fluid under pressure from chamber 20 and application piston chamber 99.

The venting of fluid under pressure from the application piston chamber 99 permits venting of fluid under pressure from brake cylinder 7 in the manner hereinbefore described. However, when the pressure of fluid in the brake cylinder acting on the upper face of piston 97 becomes slightly less than the reduced pressure in piston chamber 99, then the pressure in chamber 99 shifts the piston and exhaust slide valve 102 upwardly and laps the exhaust passages 185 and prevents further reduction in brake cylinder pressure.

In the manner just described, the foot pedal may be pressed toward the release position in successive steps and thereby cause a graduated release of fluid under pressure from the brake cylinder 7.

In effecting a release of the brakes, when the foot pedal 54 is depressed to the full release position, the cam-like member 61 is turned to the position shown in the drawings, in which roller 64 is permitted to enter recess 78 and spring 77 then operates switch 72 to connect contacts 67 and 68, so as to supply power for the electric motor 185, in the same manner as hereinbefore described.

As hereinbefore described, in effecting an application of the brakes, the maximum degree of pressure obtained in chamber 20 of the brake valve device and consequently in brake cylinder 7 is governed by the amount of compression of spring 37 and consequently by the position of plunger 38, when lug 83 on lever 49 engages the inclined surface 82 on cam 80.

The cam 80 is adapted to be turned with a shaft 79 by a handle 81, so as to change the place of engagement of lug 83 on the inclined surface 82. If the cam is in such a position that the lug 83 engages the inclined surface at its lowest point, then that permits springs 41 to rotate lever 49 and shift plunger 38 to a lower position than if the cam is in such a position that lug 83 engages the inclined surface at its highest point. It is therefore obvious that if lug 83 engages the inclined surface 82 at its lowest point, the compression of spring 37 is such as to require a greater fluid pressure in chamber 20 to move the piston 34 upwardly to permit lapping of the brake valve device, than if the lug 83 engages the inclined surface at its highest point. As hereinbefore described, the pressure of fluid in chamber 20 acts on the application piston 97 to supply fluid under pressure to the brake cylinder 7 to substantially the same degree, so that the maximum pressure obtainable in the brake cylinder is actually governed by the position of the cam 80. This is desirable in order to limit the maximum braking power on a vehicle in accordance to the load it may carry. If the car is empty, the cam 80 is turned, so that lug 83 is adapted to engage the inclined surface 82 at its highest point, and thereby limit the maximum brake cylinder pressure obtainable to a certain predetermined degree. However, if the car is fully loaded, then the cam 80 is turned so that lug 83 is adapted to engage inclined surface 82 at its lowest point and thereby limit the maximum brake cylinder pressure obtainable to a certain predetermined higher degree. For any intermediate degree of load on the car, the position of cam 80 is varied accordingly.

When the operator has the foot pedal 54 depressed to release position and the brakes are released, if for any reason it is desirable that the brakes should be applied and the operator does not apply them, the conductor on the car or a passenger may pull on cord 159 or cord 160 and thereby cause an emergency application of the brakes to be effected in the following manner:

Pulling the cord 159 or 160 rotates lever 157, which causes lever 153 to be pressed into engagement with stem 152 of vent valve 149 and shift said vent valve out of engagement with seat rib 151. This permits fluid under pressure to be vented from the vent valve chamber 148 and emergency piston chamber 122, which is connected to chamber 148 through passage and pipe 147, to the atmosphere, through atmospheric passage 198, at a rate exceeding the rate of supply to said chambers through restricted port 145 in the protection slide valve 113 and through feed groove 170 around the emergency piston 123.

The venting of fluid under pressure from emergency piston chamber 122 permits the pressure of fluid in valve chamber 124 to shift the emergency piston 123 and slide valve 125 to emergency position, in which port 172 in said slide valve registers with passage 173 and thereby permits fluid at main reservoir pressure to flow from the emergency valve chamber 124 to the application piston chamber 99 and therein act to supply fluid under pressure to the brake cylinder 7 and apply the brakes in the same manner as hereinbefore described.

To release an emergency application of the brakes effected by operation of vent valve device 4, the vent valve 149 is permitted to seat and with the foot pedal 54 in release position, the vent valve chamber 148 and emergency piston chamber 122 will gradually charge through the restricted port 145 in the protection slide valve 113. When the fluid pressures acting on the opposite faces of the emergency piston 123 then become substantially equal, spring 126 shifts the emergency piston and slide valve 125 upwardly to the position shown in the drawings, in which fluid under pressure is vented from the application piston chamber 99 to the atmosphere through the brake valve device 1. This permits venting of fluid under pressure from the brake cylinder 7 and a consequent release of the brakes in the manner hereinbefore described.

If for any reason, such as breakage of pipe 147, the pressure in main reservoir 6 and protection valve chamber 112 should reduce below the pressure of spring 116, said spring is adapted to shift piston 111 and slide valve 113 to a position in which a cavity 199 connects passage 147 to an atmospheric passage 200. Passage 147 being connected to the emergency piston chamber 122, fluid under pressure is permitted to flow from said chamber to the atmosphere and permit the emergency piston 123 and slide valve 125 to be shifted to emergency position in which an emergency application of the brakes is effected in the same manner as when effected by operation of the vent valve device 4.

As hereinbefore described, when the foot pedal is removed at the non-operating end of a car, the brake valve device at that end of the car operates to supply fluid under pressure to pipe 167 connected to chamber 130 of the double check valve device 3. In chamber 130, the pressure of fluid supplied thereto acts on valve 135 to hold said valve seated against seat rib 133, so as to establish communication from chamber 129 to pipe 169 in order to permit control of the brakes from the operating end of the car. The pressure to fluid supplied to chamber 130 to act on valve 135 must be higher than the maximum pressure that may be supplied to chamber 129 in operating the brakes, in order to permit valve 135 to remain seated. To ensure the desired degree of pressure in chamber 130 as supplied by the non-operating brake valve device, the pedal 54 is removable only in a certain position.

To change operating ends of the car, the cam 80 is turned to pedal off position in which lug 83 on lever 49 is permitted to enter recess 86 in the cam, when the pressure is removed from the foot pedal 54. In this position the inner tine 58 on the foot pedal device 54 is adapted to enter recess 87 in the cam and cam hub 84, the outer tine 58 being outside of the periphery of said cam, as shown in Fig. 2. When the lug 83 strikes the bottom of recess 86, further rotation of lever 49 is prevented. The foot pedal 54 is then raised up manually, away from the pin 53, recess 87 permitting the inner tine 58 to disengage pin 52, as shown in Fig. 5, after which the pedal may be pulled out of the brake valve device.

In removing the pedal lever 54 as just described, the brake valve device is operated to supply fluid under pressure through chamber 129 of the double check valve device 3 to application piston chamber 99 and the pressure of fluid therein acts on the application piston 97 to effect an application of the brakes in the same manner as hereinbefore described.

It will be noted that lug 83 on lever 49 engaging cam 80 in the recess 86 permits greater rotation of lever 49 than is permitted when the maximum normal brake application is effected, in which case said lug is adapted to engage the lowest point on the inclined surface 82 of said cam. Consequently, when the foot pedal is removed, the degree of pressure supplied through pipe 168 is greater than ever permitted in normally applying the brakes.

After the foot pedal 54 is removed from the brake valve device at one end of the car, it is placed in position in the brake valve device at the opposite end of the car and then depressed so as to vent the fluid under pressure from pipe 167 in the same manner as the venting of fluid under pressure from pipe 168 occurred by operating the brake valve device at the opposite end of the car.

The venting of fluid under pressure from pipe 167 reduces the pressure acting on the right hand side of valve 135, which permits the pressure acting on the opposite side of said valve to shift said valve to the right. This movement of valve 135 pulls valve 134 into engagement with seat rib 137 and establishes communication from pipe 169 to pipe 167 through which fluid under pressure is vented from the application piston chamber 99 to effect a release of the brakes in the same manner as when released by operation of the brake valve device at the opposite end of the car. When the fluid under pressure is thus vented from the valve chamber 130, the valve 135 is maintained unseated by the pressure of fluid acting in chamber 129 on the valve 134.

Depressing the foot pedal 54 to release position at the right hand end of the car causes switch member 72 to engage contacts 67 and 68, so as to energize magnet 177 for supplying power to the car motor. After the foot pedal is applied to the brake valve device at the right hand end of the car, the cam 80 is adjusted according to the load on the car and the brakes are then operated in the same manner as by the brake valve device at the left hand end of the car, as hereinbefore described.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A brake valve device for controlling the operation of a fluid pressure brake system and comprising a lever fulcrumed intermediate its ends, a spring acting on one end of said lever, a foot pedal carried by said lever for opposing the operation thereof by said spring, a cam having an inclined surface rotatable in the path of rotation of one end of said lever for varying the degree of rotation of said lever by said spring upon the removal of foot pressure from said foot pedal, and means associated with said cam for preventing the removal of said foot pedal.

2. A brake valve device for controlling the operation of a fluid pressure brake system and comprising a lever fulcrumed intermediate its ends, a spring acting on one end of said lever, a foot pedal carried by said lever for opposing the operation thereof by said spring, a cam having an inclined surface rotatable in the path of rotation of one end of said lever for varying the degree of rotation of said lever by said spring upon the removal of foot pressure from said foot pedal, and means associated with said cam for permitting the removal of said foot pedal only in one position of said cam.

3. A brake valve device for controlling the operation of a fluid pressure brake system and comprising a lever fulcrumed intermediate its ends, a spring for rotating said lever, a movable stop for limiting the degree of rotation of said lever by said spring, a removable foot pedal for controlling the operation of said lever by said spring, a recess in said stop, and a lug on one end of said lever adapted to enter said recess in one position of said stop for permitting the removal of said foot pedal.

4. A brake valve device for controlling the operation of a fluid pressure brake system and comprising a lever fulcrumed intermediate its ends, a spring for rotating said lever, a movable stop for limiting the degree of rotation of said lever by said spring, a removable foot pedal for controlling the operation of said lever by said spring, a recess in said stop, a lug on one end of said lever adapted to enter said recess in one position of said stop for permitting the removal of said foot pedal, and means included in said stop for preventing the removal of said foot pedal in all other positions of said stop.

5. A brake valve device for controlling the operation of a fluid pressure brake system and comprising a lever fulcrumed intermediate its ends, a spring for rotating said lever, a movable stop of variable height for varying the degree of rotation of said lever by said spring, and a removable foot pedal for controlling the operation of said lever by said spring, said movable stop having a position in which said foot pedal may be removed.

6. A brake valve device for controlling the operation of a fluid pressure brake system and comprising a foot pedal operative by manual pressure for releasing the brakes and operative upon the release of manual pressure to permit an application of the brakes to be effected, and manually adjustable means for varying the degree of brake application upon removal of pressure from said foot pedal and for permitting removal of said foot pedal when the maximum degree of brake application is effected.

7. In a car control device, the combination with a rotatable shaft, of a lever mounted on said shaft for controlling the brakes on the car, a switch for controlling a power circuit in the car, a cam mounted on said shaft for controlling the operation of said switch, a foot pedal removably carried by said lever for operating said lever and cam, a manually operated stop of variable height for limiting the degree of rotation of said lever and having a position in which said foot pedal is removable.

8. In a fluid pressure brake, the combination with a brake cylinder, of a brake valve device operative to supply and release fluid under pressure to and from said brake cylinder and comprising a casing having a chamber at all times in communication with said brake cylinder, an application valve for supplying fluid under pressure to said chamber, a release valve for venting fluid under pressure from said chamber, a lever pivotally mounted on the casing within said chamber for controlling the operation of said application valve and said release valve, a piston slidably mounted in the casing and carried by said lever for controlling the operation of said lever, manually controlled means for controlling the operation of said piston, and resilient means interposed between said piston and manually controlled means for permitting movement of the manually controlled means relative to the piston.

9. In a fluid pressure brake, the combination with a brake cylinder, of a brake valve device operative to supply and release fluid under pressure to and from said brake cylinder and comprising a casing having a chamber at all times in communication with said brake cylinder, an application valve for supplying fluid under pressure to said chamber, a release valve for venting fluid under pressure from said chamber, a lever disposed in said chamber and pivotally mounted on the casing intermediate its ends, said lever having one arm for controlling the operation of said application valve and said release valve, a piston slidably mounted in the casing and carried by the other arm of said lever for controlling the operation of said lever, manually operated means for controlling the operation of said piston, and means for permitting relative movement between said piston and manually operated means.

10. In a fluid pressure brake, the combination with a brake cylinder, of a brake valve device operative to supply and release fluid under pressure to and from said brake cylinder and comprising a casing having a chamber at all times in communication with said brake cylinder, an application valve for supplying fluid under pressure to said chamber, a release valve for venting fluid under pressure from said chamber, a lever pivotally mounted on the casing within said chamber for controlling the operation of said application valve and said release valve, a piston slidably mounted in the casing and carried by said lever for controlling the operation of said lever, a spring carried by said piston for controlling the operation thereof, a lever pivotally mounted on the casing for varying the pressure of said spring, and manually controlled means for operating said lever.

11. In a fluid pressure brake, the combination with a brake cylinder, of a brake valve device operative to supply and release fluid under pressure to and from said brake cylinder and comprising a casing having a chamber at all times in communication with said brake cylinder, an application valve for supplying fluid under pressure to said chamber, a release valve for venting fluid under pressure from said chamber, a lever pivotally mounted on the casing within said chamber for controlling the operation of said application valve and said release valve, a piston slidably mounted in the casing and carried by said lever for controlling the operation of said lever, a spring carried by said piston for controlling the operation thereof, resilient means for increasing the pressure of said spring, a lever operatively connecting said spring and resilient means, and a manually operated means carried by the last mentioned lever for controlling the operation of said resilient means.

12. In a fluid pressure brake, the combination with a brake cylinder, of a brake valve device operative to supply and release fluid under pressure to and from said brake cylinder and comprising a casing having a chamber at all times in communication with said brake cylinder, an application valve for supplying fluid under pressure to said chamber, a release valve for venting fluid under pressure from said chamber, a lever pivotally mounted on the casing within said chamber for controlling the operation of said application valve and said release valve, a piston slidably mounted in the casing and carried by said lever for controlling the operation of said lever, a spring for controlling the operation of said piston, a movable plunger for varying the pressure of said spring on said piston, and means for controlling the operation of said plunger, said means comprising a brake applying spring, a lever pivotally carried by the casing for transmitting the force of said brake applying spring to said plunger, and a manually operated lever carried by the last mentioned lever for applying pressure to said brake applying spring.

13. In a fluid pressure brake, the combination with a brake cylinder, of a brake valve device operative to supply and release fluid under pressure to and from said brake cylinder and comprising a casing having a chamber at all times in communication with said brake cylinder, an application valve for supplying fluid under pressure to said chamber, a release valve for venting fluid under pressure from said chamber, a lever pivotally mounted on the casing within said chamber for controlling the operation of said application valve and said release valve, a piston slidably mounted in the casing and carried by said lever for controlling the operation of said lever, a spring for controlling the operation of said piston, a movable plunger for varying the pressure of said spring on said piston, and means for controlling the operation of said plunger, said means comprising a brake applying spring, a follower member carried by said brake applying spring, a lever pivotally carried by the casing, an operating pin interposed between one end of the last mentioned lever and said plunger, another pin interposed between the other end of the last mentioned lever and said follower member, and manually operated means carried by the last mentioned lever for controlling the operation thereof.

JOSEPH C. McCUNE.